Patented Sept. 15, 1953

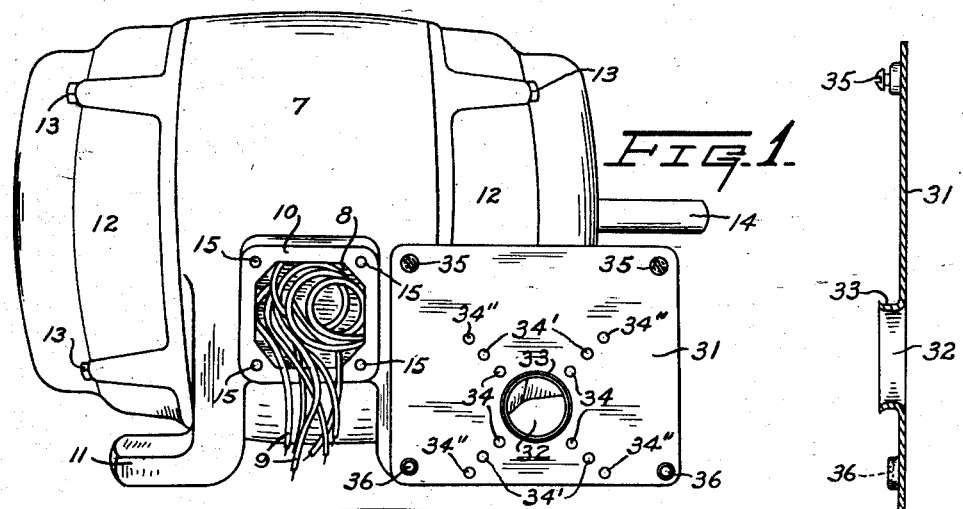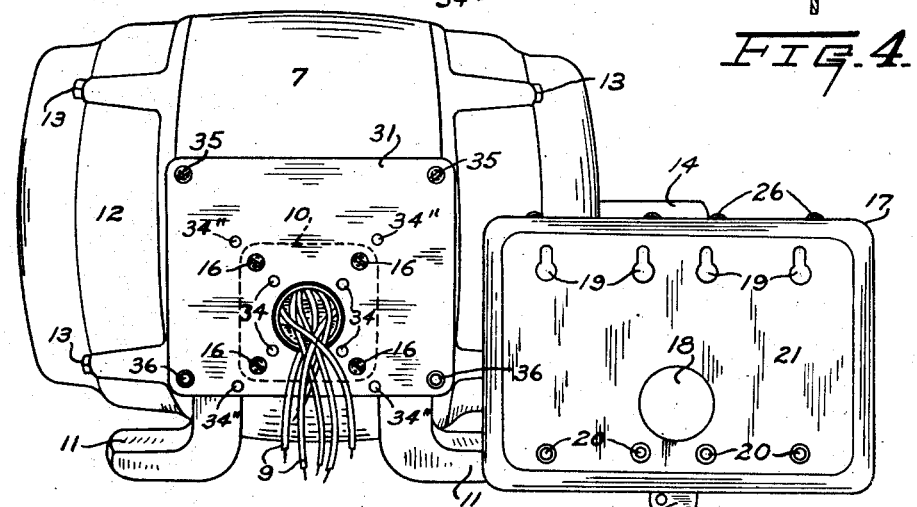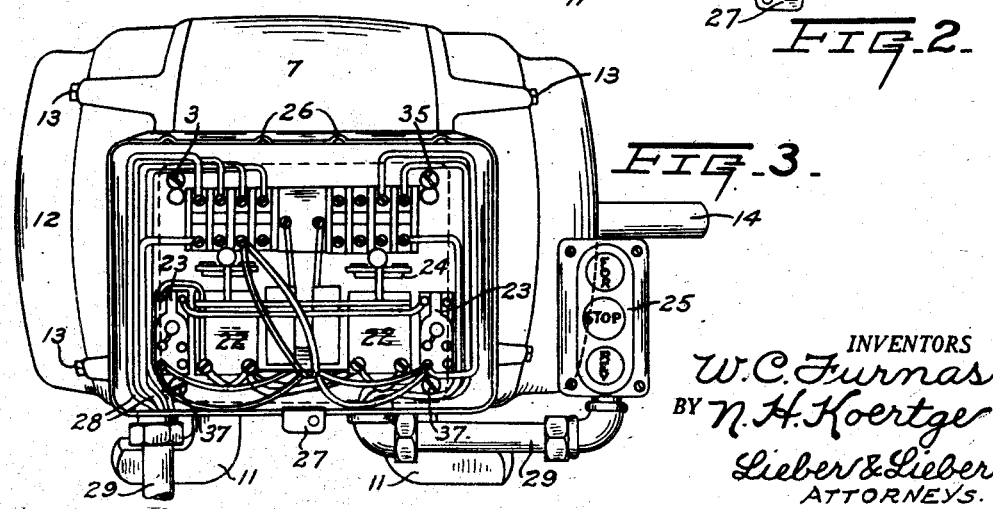

2,652,506

UNITED STATES PATENT OFFICE 2,652,506

MOUNTING FOR ELECTRIC MOTOR STARTERS

William C. Furnas, Batavia, and Nobel H. Koertge, Glen Ellyn, Ill., assignors to Furnas Electric Company, Batavia, Ill., a corporation of Illinois Application April 11, 1952, Serial No. 281,758

3 Claims. (Cl. 310—71)

Our present invention relates generally to improvements in composite electrical equipment, and relates more particularly to improvements in the construction of combined electric motors and starting switches therefor especially of the magnetically closed and gravity opened type.

The primary object of our invention is to provide an improved starter switch mounting for standard electric motors of various types or styles, whereby the motor and its starting switch assemblage are combined into a single compact unit.

It has heretofore been universal practice to mount the starting switches for electric motors on supports remote from and independent of the motors, and to provide elongated conduits for leading the motor energizing conductors from the motor frame outlets to the switch housing casings. This procedure not only necessitates the provision of a separate mounting for the switch and the use of extensive conduits and fittings as well as extra long conductor wires, but also requires both the motor base and the switch to be disconnected from their moorings and subsequently remounted whenever it becomes desirable to move the same to a new location. It is a well established fact that the frames of all standard electric motors of considerable capacity, are provided with spacious conductor outlets surrounded by conduit attachment pads having uniformly spaced attaching screws associated therewith for clamping the conduit coupling flanges to these motor pads, and that the starting switches of such motors are preferably of the magnetic type wherein the switch contacts are closed by magnetic influence and are opened by gravity both acting upon a reciprocable armature or magnetic core. Such a magnetic switch must therefore be disposed in a position which will permit the armature to function properly, and it is perhaps for this reason that these switches have heretofore been mounted independently of their motors.

It is therefore an important object of the present invention to provide improved instrumentalities for effecting convenient mounting of these starting switches directly upon the motor frame outlet pad of various sizes and types of motors without the aid of complicated conductor confining conduits and fixtures, and in a manner whereby the motor and its control switch become a unitary structure carried by the motor base.

Another important object of this invention is to provide an improved starter switch mounting whereby a magnetic starter may be suspended directly from the frame of its motor so as to reduce the length of the current conductors leading from the motor to the switch, to a minimum, and to further provide an exceedingly compact combined unit.

An additional object of the invention is to provide an improved motor and starting switch unit wherein the housing of the starter switch unit may be mounted directly upon various styles of motors with the interior of the housing in direct open communication with the motor conductor outlet.

A further object of our invention is to provide simple and conveniently attachable means for suspending a vertically operable magnetic switch directly from an electric motor frame so as to permit direct connection of the motor leads to the switch terminals without utilizing conductor conduits.

Still another object of our present invention is to provide an improved switch attachment for effecting suspension of various types of magnetic starters directly from the frames of diverse styles of electric motors in a manner whereby the combined motor and switch assembly may be installed as a unit and most efficient operation of the switch is assured at all times.

These and other more specific objects and advantages of the present improvement will be apparent from the following detailed description from which it will be apparent that the gist of the invention is the provision of an improved mounting for motor starter switches especially of the magnetic type, whereby such switches of various types may be readily and firmly suspended directly from the frames of diverse styles and sizes of motors with the aid of a simple mounting plate so as to produce a unitary motor and switch assemblage devoid of unduly long conductors and conductor confining conduits.

A clear conception of the features constituting our present improvement and of the construction and operation of a typical motor and starter unit embodying the invention, may be had by referring to the drawing accompanying and forming a part of this specification wherein like reference characters designate the same or similar parts in the various views.

Fig. 1 is a side perspective view of a standard reversible electric motor looking toward the conductor outlet and surrounding pad, and showing one of our improved switch mounting plates disposed next to the motor pad;

Fig. 2 is a similar view of the same electric motor but with the switch mounting plate attached to its pad, and also showing a rear view of a magnetic switch housing adapted for suspension from the plate;

Fig. 3 is another similar view of the same electric motor with the switch housing and magnetic switch finally applied to the mounting plate and connected to the motor conductors, but with the switch housing cover omitted; and Fig. 4 is an enlarged central vertical section through the switch mounting plate shown in Figs. 1 and 2.

While the typical embodiment of the invention shown herein, depicts the mounting of a duplex magnetic starter switch of the type forming the subject of the H. E. Cobb and W. C. Furnas application Serial No. 155,651, filed April 13, 1950, upon a standard reversible electric motor of medium capacity, and wherein the push-button control switch is separate from the magnetic starter, it is not our desire or intent to unnecessarily restrict the utility of the improvement by virtue of this limited disclosure; and it is also contemplated that specific descriptive terms employed herein be given the broadest possible interpretation consistent with the disclosure.

Referring to the drawing, the standard reversible electric motor shown therein by way of illustration, comprises in general a sturdy annular frame 7 having a front outlet 8 for its electric current conductors 9 surrounded by an upright plane rectangular attaching pad 10, and also having a supporting base or feet 11 at the bottom thereof; opposite end heads 12 attached to the frame 7 by cap screws 13; and a power transmitting shaft 14 journalled in bearings in the end heads 12 and projecting outwardly beyond one of these heads. While these standard motors are obtainable in various styles and capacities, this type of side or front outlet motor is always provided with an integral pad 10 of round or rectangular shape having four or more tapped holes 15 spaced equi-distant from each other and from the central axis of the conductor outlet 8, and the spacing of these holes 15 varies only with the size or particular style of the motor. In the present commercial motors these holes 15 are utilized merely for the reception of standard screws 16 adapted to clamp a closure plate or a flanged conduit fixture to the pad 10, and are not employed for the purpose of suspending a starter switch directly from the frame 7.

The relatively standard magnetic switch or starter shown in the drawing by way of illustration, is of the magnetically closed and gravity opened type shown in copending application Serial No. 155,651, and comprises in general a cup-shaped sheet metal rear housing 17 having a central opening 18 and upper and lower holes 19, 20 respectively, in the rear wall 21 thereof; and a pair of magnetic switch units 22 adapted to be detachably suspended from the housing wall 21 in any suitable manner, as for instance in said application. These starter switches are provided with protective overload relays 23 and with movable contact carriers 24, and may be controlled by means of a pushbutton switch 25 mounted either directly within the housing as in said application, or at a remote control station outside of the housing 17 as in Fig. 3. The main switch housing 17 may also be provided with a closure cover, not shown, but which is hung from lugs 26 formed on the upper housing wall and is cooperable with a latching flange 27 secured to the lower housing wall. The current conductors 28 of the magnetic switch are adapted to be concealed within the usual conduits 29, as shown in Fig. 3.

In accordance with the present invention, we provide simple but effective means for suspending such starter switches directly from the motor frame 7, and as shown in Figs. 1, 2 and 4, this switch suspension means consists of a flat rectangular metal mounting plate 31 having a medial opening 32 surrounded by an outwardly projecting annular flange 33, and also having several series of holes 34, 34', 34" therein, outwardly beyond the flange 33 and adapted to register with correspondingly spaced tapped holes 15 formed in the pads 10 of different styles or sizes of electric motors. The rectangular plate 31 is moreover provided, at its upper corners with suspension screws 35 the heads of which are adapted to pass through the upper outer pear shaped holes 19 in the housing wall 21 and the shanks of which are cooperable with the reduced upper portions of these holes, while the lower corners of the plate 31 are provided with threaded holes 36 formed for the reception of clamping screws 37 passing through similarly disposed lower holes 20 of the rear housing wall.

When the improved mounting plate 31 has been properly constructed as above described, it may be readily utilized to suspend a duplex magnetic switch such as shown to a standard electric motor of the type illustrated, in the following manner. The opening 32 of the mounting plate 31 shown in Figs. 1 and 4 should be slipped over the motor current conductors 9 and the plate 31 may then be firmly attached to the motor pad 10 by applying the screws 16 through the intermediate series of holes 34' to the threaded pad holes 15, as illustrated in Fig. 2. The conductors 9 of the motor should thereafter be passed through the opening 18 in the rear wall 21 of the switch housing 17 and this rear housing may then be suspended from the upper corner screws 35 of the mounting plate 31 and may be clamped to the plate 31 by passing the screws 37 through the holes 20 and applying them to the threaded lower holes 36. The motor conductors 9 should thereafter be properly attached to the terminals of the magnetic switches 22 and the line conductors 28 should be passed through the outlet openings at the bottom of the housing 17 and should thereafter be properly attached to the terminals of the magnetic switches 22, whereupon the magnetic switches may be suspended from the rear housing wall 21 and the conduits 29, control switch 25, and the switch cover may be applied to complete the assemblage.

When a single or duplex magnetic switch has been thus applied to a motor, the switch armature will be properly positioned for vertical reciprocation, and the combined motor and switch unit may be moved without disconnecting the motor conductors 9 from the control switches. The same mounting plate 31 may also be utilized to suspend a similar magnetic switch from a larger motor pad 10 by applying the clamping screws 16 to the outer series of holes 34", and may likewise be utilized to suspend such a switch from a smaller motor pad 10 by applying the screws 16 to the inner series of holes 34. In each case, motor conductors 9 of relatively short length may be employed, and when the switch housing 17 is applied to the mounting plate 31 the annular flange 33 of this plate extends through the switch housing opening 18 and provides a smooth and unobstructed conduit which effectively conceals and protects the current conductors 9.

From the foregoing detailed description it will be apparent that the present invention provides simple and effective means for conveniently suspending diverse types of standard vertically operable magnetic switches directly from the frames of various styles and sizes of electric motors so as to produce compact composite units. The push-button control switches 25 of these units may be varied considerably and can be located either directly within or remote from the magnetic switches without departing from the present invention, and relatively few modifications of the mounting plates 31 are required in order to accommodate all sizes and styles of electric motors in which the pads 10 and attaching holes 15 have been standardized by all motor manufacturers.

While the invention has special utility and assumes very simple form when applied to vertically operable magnetic switches associated with motors having upright front or side outlet pads 10, it is also applicable to motors having these pads otherwise disposed, and the improvement has in fact proven highly satisfactory and successful in actual use in connection with various types of magnetic starters. When utilizing duplex magnetic switches in connection with reversing motors it is customary to mount the control switch 25 as shown; but this control switch is ordinarily mounted directly within the main switch housing 17 in single magnetic starters.

It should be understood that it is not desired to limit the present invention to the exact details of construction and to the precise assembly procedure, herein specifically shown and described, for various modifications within the scope of the appended claims may occur to persons skilled in the art.

We claim:

1. In combination with an electric motor having a conductor outlet surrounded by an upright pad provided with tapped holes spaced around the outlet, a mounting plate having a relatively large medial opening alineable with said motor outlet and surrounded by an outwardly projecting annular flange forming a horizontal tubular passage for extension of the motor conductors therethrough and being provided about said flange with several series of holes adapted to receive attaching screws cooperable with the tapped holes of different styles or sizes of motors, a magnetic switch operable only in upright position and having a housing provided with a horizontal opening adapted to snugly receive said tubular flange and to hold the switch in upright position, and means for attaching said housing to said plate.

2. In combination with an electric motor having a conductor outlet surrounded by an upright pad provided with tapped holes spaced around the outlet, a mounting plate having a relatively large medial opening alineable with said motor outlet and surrounded by an outwardly projecting annular flange forming a horizontal tubular passage for extension of the motor conductors therethrough and being provided about said flange with several series of holes radiating from said medial plate opening and formed to receive attachment screws cooperable with the tapped holes of various styles of motors, a magnetic starter switch operable only in upright position and having a housing the rear wall of which is provided with a horizontal opening adapted to snugly receive said tubular flange and to maintain the switch in upright position, and means for attaching said housing to said plate.

3. In combination with an electric motor having a conductor outlet surrounded by an upright pad provided with tapped holes spaced around the outlet, a mounting plate having a relatively large medial opening alineable with said motor outlet and surrounded by an outwardly projecting annular flange forming a horizontal tubular passage for extension of the motor conductors therethrough and being provided about said flange with several series of holes radiating from said medial plate opening and formed to receive attachment screws cooperable with the tapped holes of various styles of motors, a magnetic starter switch operable only in upright position and being detachably suspended within a housing having a rear upright wall provided with a horizontal opening adapted to snugly receive and to swing about said tubular flange to position and maintain the switch in upright position, and means for detachably securing said rear housing wall to said plate remote from said opening and beyond said series of holes.

WILLIAM C. FURNAS.
NOBEL H. KOERTGE.

References Cited in the file of this patent

FOREIGN PATENTS

| Number | Country | Date |
|--------|---------|------|
| 164,928 | Austria | Dec. 27, 1949 |